Figure 7:
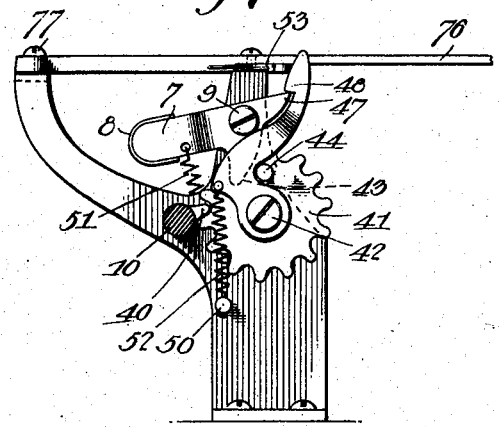

No. 760,655. PATENTED MAY 24, 1904.
T. F. SOLON.
PHONOGRAPH.
APPLICATION FILED SEPT. 1, 1903.
NO MODEL. 6 SHEETS—SHEET 1.
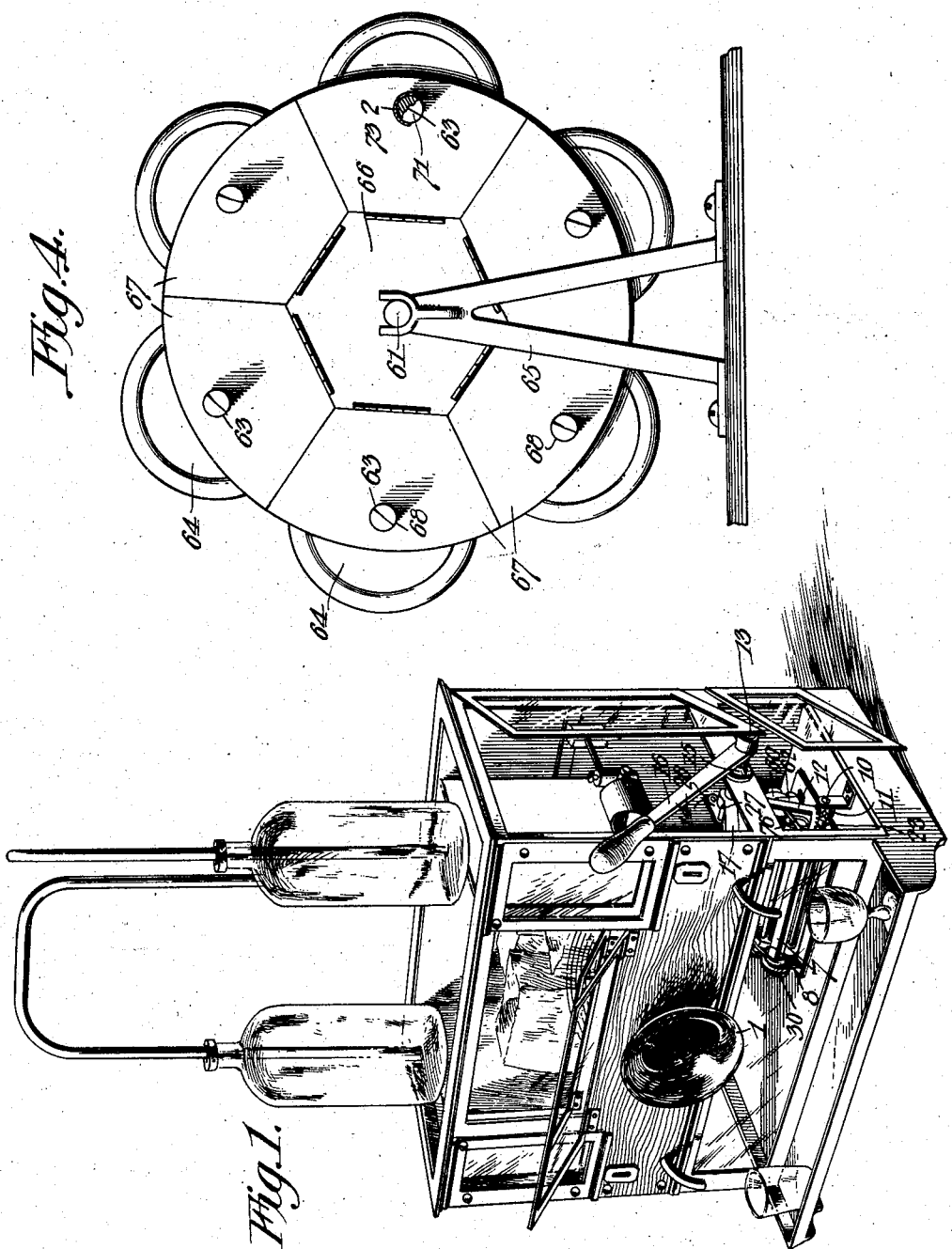
Witnesses
Thomas F. Solon, Inventor.
by
Attorneys

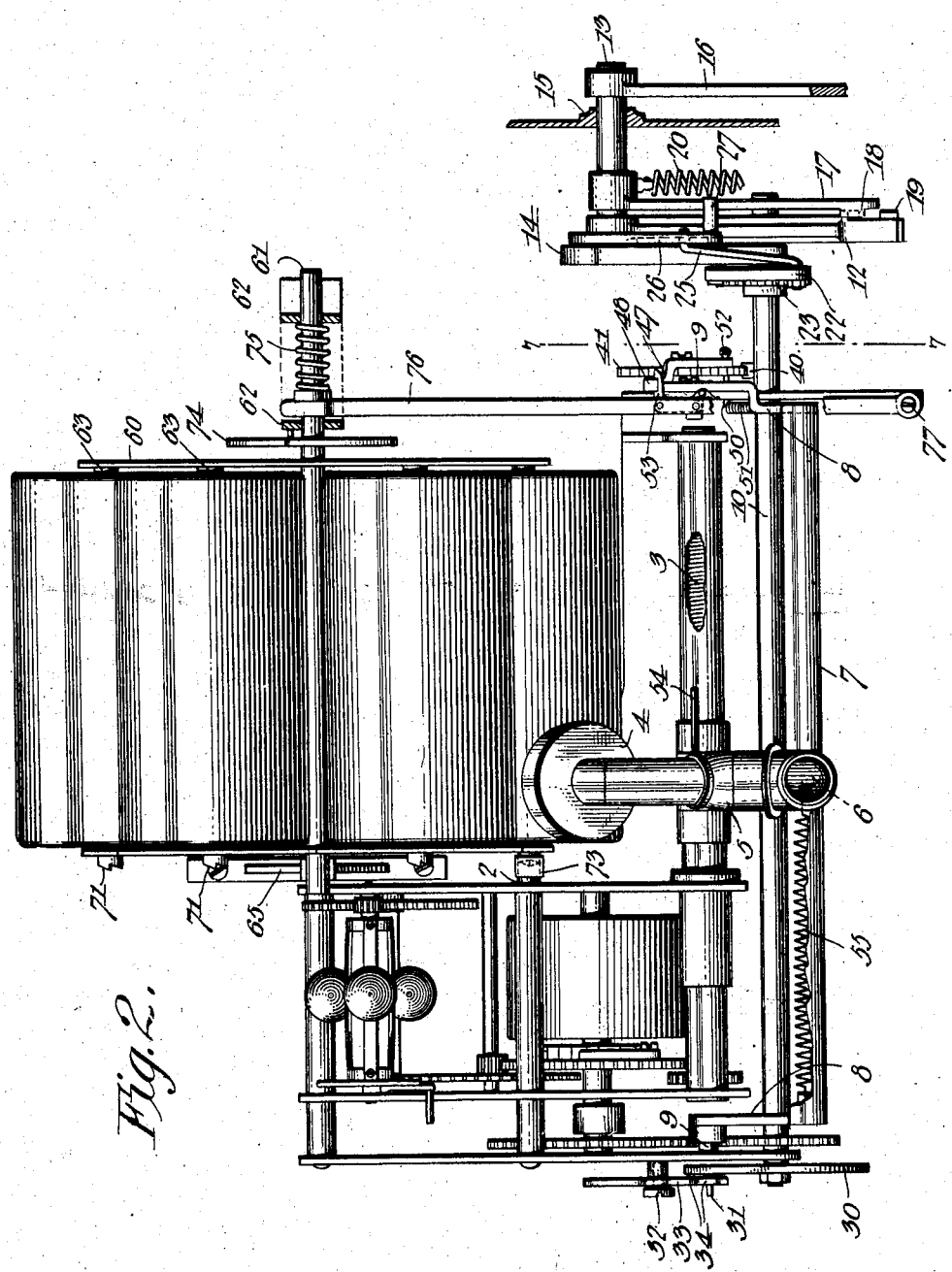

No. 760,655. PATENTED MAY 24, 1904.
T. F. SOLON.
PHONOGRAPH.
APPLICATION FILED SEPT. 1, 1903.
NO MODEL. 6 SHEETS—SHEET 3.

Witnesses
Thomas F. Solon, Inventor.
by C. A. Snow & Co.
Attorneys

No. 760,655. PATENTED MAY 24, 1904.
T. F. SOLON.
PHONOGRAPH.
APPLICATION FILED SEPT. 1, 1903.
NO MODEL. 6 SHEETS—SHEET 4.
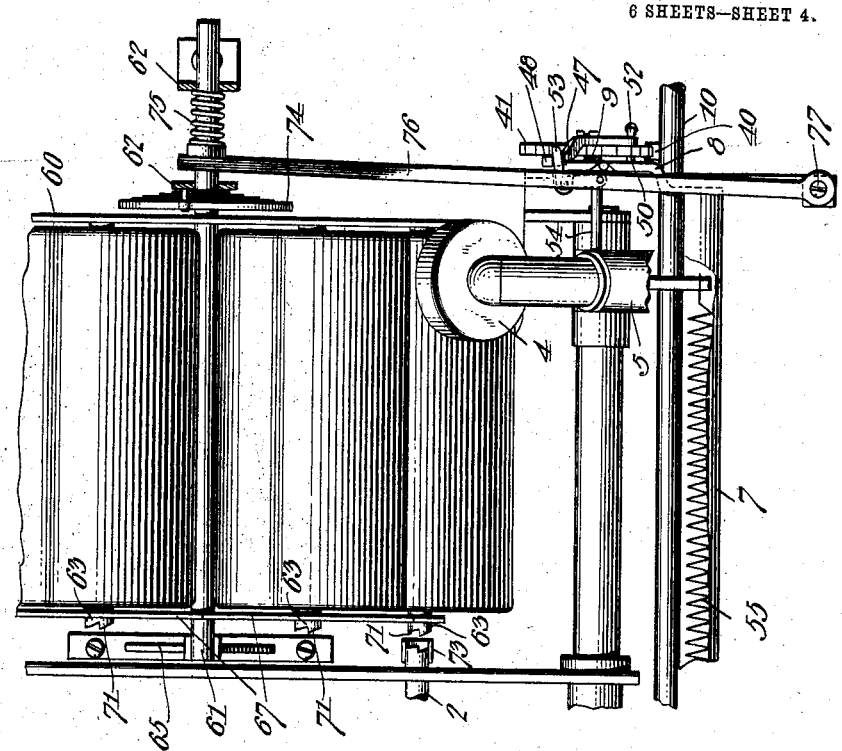
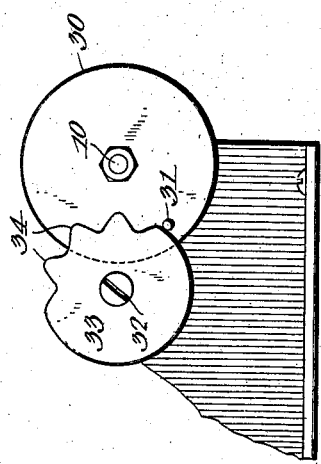
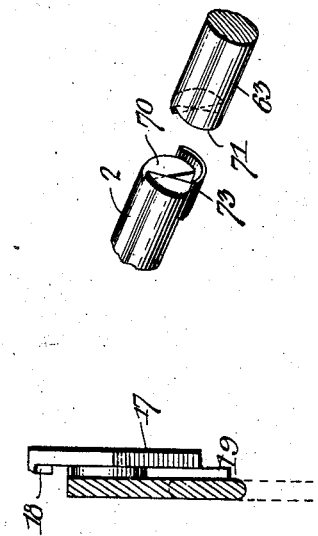
Witnesses Thomas F. Solon, Inventor.

No. 760,655. PATENTED MAY 24, 1904.
T. F. SOLON.
PHONOGRAPH.
APPLICATION FILED SEPT. 1, 1903.
NO MODEL. 6 SHEETS—SHEET 5.

Witnesses
Thomas F. Solon, Inventor.
by C. A. Snow & Co.
Attorneys

No. 760,655. PATENTED MAY 24, 1904.
T. F. SOLON.
PHONOGRAPH.
APPLICATION FILED SEPT. 1, 1903.
NO MODEL. 6 SHEETS—SHEET 6.

Witnesses

Thomas F. Solon, Inventor.
by C. A. Snow & Co.
Attorneys

No. 760,655. Patented May 24, 1904.

UNITED STATES PATENT OFFICE.

THOMAS F. SOLON, OF SOLON SPRINGS, WISCONSIN.

PHONOGRAPH.

SPECIFICATION forming part of Letters Patent No. 760,655, dated May 24, 1904.

Application filed September 1, 1903. Serial No. 171,575. (No model.)

*To all whom it may concern:*

Be it known that I, THOMAS F. SOLON, a citizen of the United States, residing at Solon Springs, in the county of Douglas and State of Wisconsin, have invented a new and useful Phonograph, of which the following is a specification.

This invention relates to certain improvements in phonographs and similar sound-reproducing machines, and has for its principal object to provide a novel form of mechanism in which a plurality of records are mounted on a carrier which may be revolved automatically to present the records successively to the sound-box.

A further object of the invention is to provide in graphophones, phonographs, and similar sound-reproducing machines for the stopping of the operation of the machine before the sound-box has traversed the entire record, so that said record may contain a number of different speeches, catch phrases, epigrams, and the like, which may be repeated in consecutive order, the sound-box and record stopping at intervals between successive short-sound records and returning movement of the sound-box being prevented until the end of the cylinder is reached.

A still further object of the invention is to provide a device of this character in which provision is made for the employment of a plurality of records which are successively adjusted to operative position with respect to the threaded sound-box-traversing shaft of the talking-machine, the adjusting apparatus being automatic in its operation and serving to present a fresh record after the sound-box has entirely completed the reproduction of a previous record.

A still further object of the invention is to provide a novel form of mechanism automatically set into operation at the completion of a sound-reproducing period and serving at one movement to adjust the parts to position for the return of the sound-box to the starting end of the machine and to permit of the movement of a fresh record to the proper position with respect to the motor-shaft.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 8:
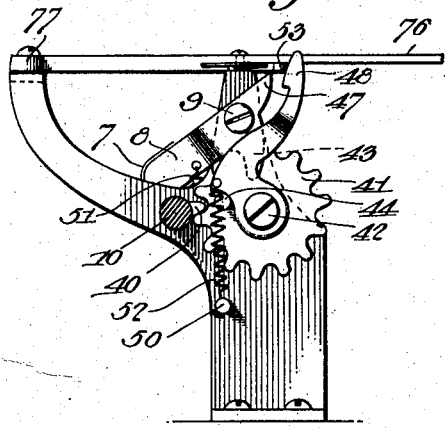
Figure 3:
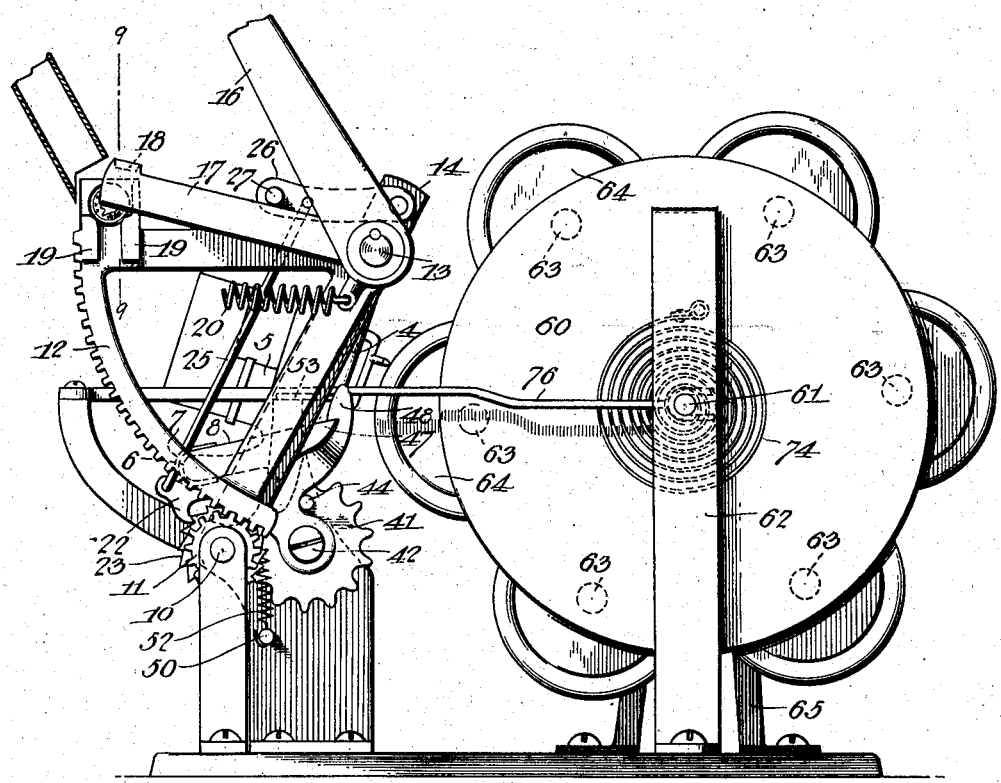
Figure 11:
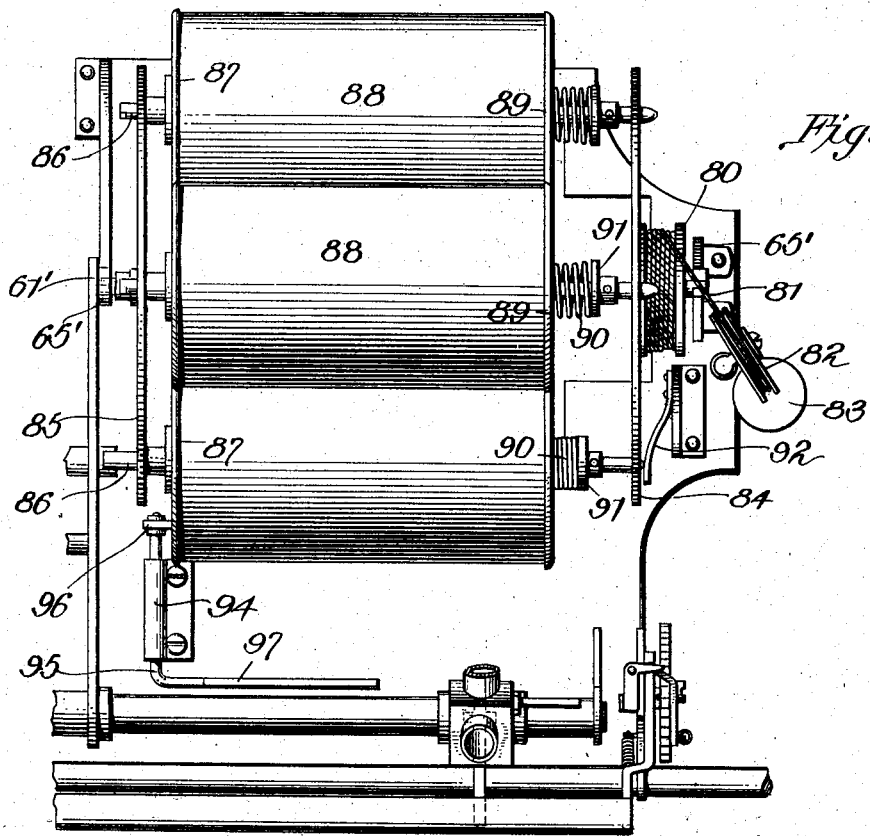
Figure 13:
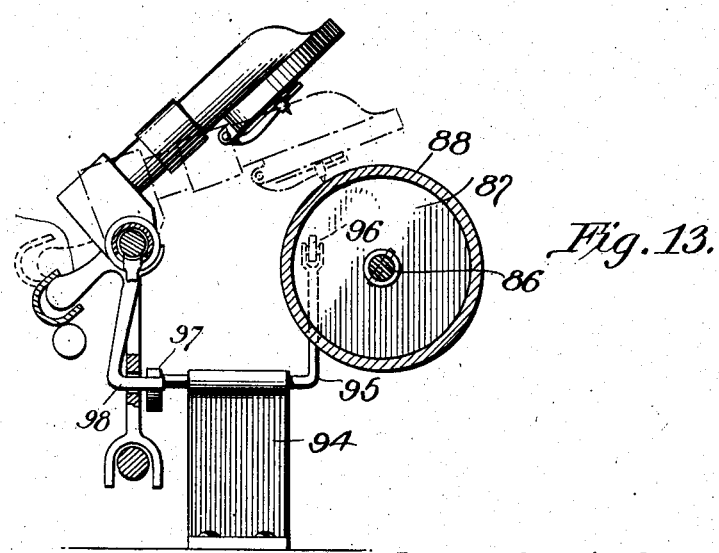
Figures 12, 14, 15:
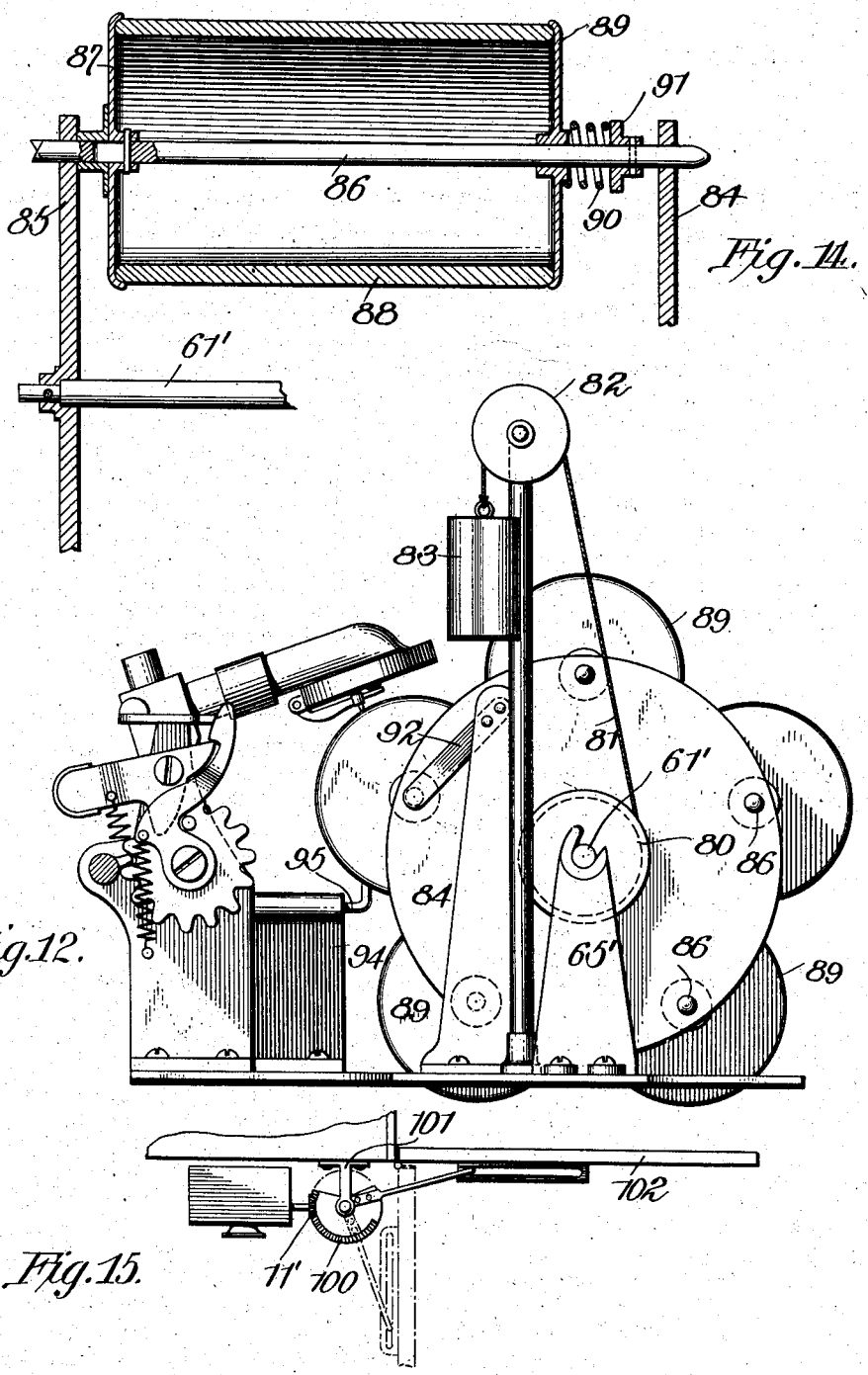

In the accompanying drawings, Figure 1 is a general perspective view of a vending-machine constructed in accordance with my invention. Fig. 2 is a plan view, partly in section, of the sound-reproducing machine. Fig. 3 is an end elevation of the sound-reproducing machine. Fig. 4 is an elevation of a portion of the carrier or support for a plurality of records. Fig. 5 is a partial plan view showing the movement of some of the parts when the sound-box has completed the reproduction of an entire record. Fig. 6 is an elevation looking from the left-hand end of the machine and showing the means for limiting the winding and the reproducing movements of the machine. Fig. 7 is a transverse sectional elevation of a portion of the machine on the line 7 7 of Fig. 2. Fig. 8 is a view similar to Fig. 7, the parts being illustrated in different position. Fig. 9 is a detail sectional view of a portion of the device on the line 9 9 of Fig. 3. Fig. 10 is a detail perspective view illustrating the clutch connection between the main and one of the auxiliary mandrel-shafts. Fig. 11 is a plan view illustrating a modified construction of the multiple-record carrier. Fig. 12 is an end elevation of the same. Fig. 13 is a transverse sectional view showing the mounting of the sound-box. Fig. 14 is a detail sectional view through a portion of one of the sound-records, illustrating the construction and arrangement of the multiple-record carrier shown in Figs. 11 and 12. Fig. 15 illustrates a slight modification hereinafter referred to.

Similar numerals of reference are employed to indicate corresponding parts throughout the several figures of the drawings.

While the machine forming the subject of the present invention may be employed in the same manner as other sound-reproducing machines for the reproduction of musical selections and the like on the insertion of a coin of proper denomination, it is principally intended for use in connection with a vending apparatus so arranged that a single operating-lever may set both into operation, and the inserted coin acting first to release the mechanism of the vending device and then to release the normally locked sound-reproducing machine, the latter carrying records, preferably in the nature of catch phrases, witty remarks, or short sentences extolling or advertising the goods delivered by the vending-machine.

The vending-machine shown in the drawings is one of that class employed for the dispensing of beverages which may be delivered from the original packages, the bottles or other vessels containing the beverages being placed on top or within the casing of the machine and connected by suitable tubes to measuring devices which deliver to the customer a predetermined quantity of the liquid. The sound-reproducing machine, preferably of the graphophone type, is arranged within the lower portion of the casing, and its sound-box is connected by a flexible tube to a trumpet 1, opening at the front of the casing, or is otherwise connected to the ear-tubes in any manner common to sound-reproducing machines. The sound-reproducing machine is provided with a spring-motor of the usual type, connected to a governor and to the mandrel-shaft 2, which actuates the cylindrical record. The spring-motor is further connected to the usual threaded shaft 3, which operates in the usual manner to impart longitudinal movement to a sound-box 4, carried by a frame 5. At the front of the frame is the usual handle 6, which may be moved up to place the sound-box in contact with the record or depressed to disengage the sound-box from the record and the nut of the sound-box frame from the threaded shaft. The handle 6 extends within a trough-shaped bar 7, which is connected at opposite ends of the frame to the arms 8, mounted on pivot-pins 9 and provided with mechanism hereinafter described for either raising or depressing the trough to adjust the position of the sound-box. In the front portion of the frame is journaled the winding-shaft 10, having the usual gearing connections with the spring-carrying shaft, and at one end of said winding-shaft is secured a pinion 11, with which meshes a segment 12, mounted loosely on a shaft 13, the shaft being supported at one end by a bracket-arm 14, extending upward from the winding-shaft, while the opposite end of said segment-carrying shaft passes through a suitable bearing 15, formed in one end of the casing. To the outer end of the shaft 13 is secured an operating-lever 16, having a suitable handle which may be grasped by the person inserting the coin and depressed to effect the winding of the spring. To this shaft is also secured an arm 17, provided at its outer end with an overhanging tongue 18, projecting in the direction of the segment, and said segment is provided with a pair of spaced lugs 19, forming a seat for an inserted coin, the coin being conducted to the seat by means of a suitable chute.

To the hub of the arm 17 is secured a pin forming a connection for one end of a contractile spring 20, the opposite end of which is secured to a fixed point, such as the end of the bar 7, and serves to return the arm and the operating-lever to initial positions after each movement. When the lever and arm are depressed after the insertion of the coin, the latter is caught by the tongue 18, and as it cannot move downwardly between the lugs 19 the movement of the lever is imparted to the segment, said segment turning and through the pinion 11 revolving the winding-shaft 10. Should no coin be placed in the seat formed by the lugs, the tongue will pass between said lugs without effecting operative movement of the segment. When the spring is wound, it is retained in the wound position by means of a pawl 22, pivoted to the bracket-arm and engaging a ratchet-wheel 23, secured to the winding-shaft. The outer end of the pawl is connected by a rod 25 to an arm 26, pivoted to a stud near the upper end of the bracket-arm, and said arm 26 has a laterally-projecting pin 27 disposed in the path of movement of the arm 17, so that when the latter ascends under the influence of the spring 18 the pin will be raised and effect a corresponding movement of pawl 22, the latter moving from engagement with the ratchet-wheel, and permit the wound spring to set the mechanism into operation.

As the sound-records are intended to be comparatively short, it becomes necessary to employ a mechanism for positively stopping the movement of the record and the travel of the sound-box at a predetermined period. For this purpose the left-hand end of the winding-shaft 10 is provided with a disk 30, from which projects a pin 31. At a convenient point on the frame of the machine is a stud 32, carrying a disk 33, provided with a number of teeth 34, which may be engaged by the pin 31 as the winding-shaft and disk 30 are rotated. During the winding movement of the shaft the pin 31 moves from engagement with the circular periphery of the disk 33 and after one complete revolution of the disk 30 enters the space between two of the teeth 34 and revolves said disk 33 to the extent of a single tooth, this operation being repeated at each complete rotation of the disk 30 until the pin 31 finally comes into contact with a solid portion of the periphery of disk 33, at which time the winding operation must cease. When the winding-shaft is released and allowed to revolve in the opposite direction under the influence of the spring, the disk 33 is again turned in a similar manner, but in an opposite direction, and the unwinding movement ceases, when the pin 31 again assumes its initial position, the stoppage being positive and the sound-box and record being positively stopped at a predetermined point. Machines of this class as ordinarily constructed are so arranged as to traverse the sound-box from end to end of the record and then automatically return the sound-box to initial position to effect another reproduction or in a similar manner to effect the reproduction of a second record, which may be brought into proper position by suitable mechanism. In the present machine, where each record is subdivided so that it may contain a number of short speeches, verses, or the like, it is intended that the sound-box shall remain in the position to which it is moved at the completion of each reproduction, except at the reproduction of the last record on the cylinder, at which time there is set into operation a mechanism for restoring the sound-box to the usual starting-point. The stopping mechanism previously described therefore acts to stop both the rotation of the record and the movement of the sound-box while the stylus is still in contact with the record, and after the insertion of a second coin and a second winding movement the record again starts and the sound-box is again moved until the second reproduction is effected, and so on until the sound-box arrives at the end of the cylinder.

At the right-hand end of the machine, or at that end at which the winding-segment is placed, the winding-shaft is provided with a pin or tooth 40, which is moved into engagement with the teeth of a wheel 41, mounted on a suitable stud 42, the latter being moved to an extent depending on the rotative movement of the winding-shaft. The arms 8, which carry the trough 7, are pivoted, as before described, on studs 9, and one of said arms 8 is provided with a depending lug 43, which is engaged by a pin 44, carried by the toothed wheel 41 and serves to elevate the trough 7 after the sound-box has been restored to the starting-point. The arm 8 is further provided with a projecting tooth 47, engaged normally by a latch 48, pivoted on the stud 42 and serving to maintain the trough in elevated position and through said trough to hold the sound-box in contact with the record-cylinder and the half-nut of the box-carriage in engagement with the threaded shaft. The frame is provided with a pin 50, carrying two springs 51 and 52, the spring 51 being connected to the arm 8 and tending to depress the trough, while the spring 52 is connected to the latch 48 and tends to hold the latter in engagement with the tooth 47 of the arm 8.

To the upper portion of the frame is pivoted a bell-crank trip-lever 53, one arm of which projects within the path of movement of a small bar 54 on the sound-box-carrying frame, while the opposite arm of said lever is adapted to come into engagement with the upper end of the latch 48 and move the same from engagement with the tooth 47 of the arm 8 at the time the sound-box arrives at the end of the record-cylinder. When the arm 8 is released from the catch 48, the spring 51 instantly depresses the trough 7 and by the shifting of the usual handle 6 raises the box from engagement with the record and moves the half-nut from contact with the threaded shaft 3, thus permitting the returning spring 55 to restore the sound-box carriage to the starting-point. The parts then remain in this position until the first winding of the spring, when the pin 46 on toothed wheel 41 comes into engagement with the depending lug 44 of lever 8 and again restores the trough 7 and the parts which it operates to initial position, the tooth 47 passing under the latch 48 and the spring 52 of said latch serving to hold the latch in locked position and the trough elevated during all of the similar reproductions in the length of the cylinder.

The mechanism thus far described is applicable for use in connection with single records, or where frequent change is desired it is preferred to employ the mechanism in connection with the plurality of sound-records which may be moved automatically into operable relation with the sound-box and the actuating mechanism of the machine. For this purpose there is employed a disk 60, mounted on a spindle 61, which at one end passes through suitable bearing-openings in a pair of parallel standards 62, arranged at a slight distance from the mandrel-shaft 2 of the machine. This shaft carries a plurality of auxiliary mandrel-shafts 63, having mandrels 64, on which may be placed suitable records. The opposite end of the shaft 61 rests in a bearing carried by a truss-frame 65, arranged near the right-hand end of the machine, and to this end of the shaft there is secured a plate 66 of a shape depending on the number of auxiliary mandrel-shafts, the plate in the present instance being shown as hexagonal in form and six auxiliary mandrel-shafts being employed. To each of the six sides of the disk is pivoted or hinged a plate 67, having a central opening 68 for the reception of the left-hand end of the mandrel-plate, the construction permitting of the ready movement of the shaft to open position when it is desired to substitute a fresh record for those carried by the mandrels.

The main actuating-shaft 2 is quite short and terminates in a clutch-face 70, adapted to interlock with a similar clutch-face 71, formed on each of the auxiliary mandrel-shafts 63 as the latter are successively brought into engagement therewith. Beyond the clutch-face the mandrel-shaft is provided with a small lip or flange 73, which serves to receive the end of the mandrel-shaft as the latter moves to position and to guide the same into engagement with the clutch-face of the main shaft.

To the shaft 61 is secured one end of a coiled spring 74, the opposite end of said spring being secured to the fixed frame, and said spring is of sufficient strength to revolve the shaft, the disk 60, and all of the auxiliary mandrels when released. The shaft 61 is further provided with a helical compression-spring 75, which normally throws the shaft, the disk, and all of the mandrels toward the left-hand end of the machine, so that when free to operate this spring will act to keep an auxiliary mandrel-shaft in clutching engagement with the main mandrel-shaft, and the rotations to the latter will be imparted to the auxiliary shaft with which it is interlocked.

In order to release one of the auxiliary mandrel-shafts from engagement with the main actuating-shaft, it becomes necessary to contract the spring 75 and withdraw the shaft 61 and all of the auxiliary shafts toward the right of the machine, and for this purpose there is employed a lever 76, pivoted at one end to a stud 77, carried by the fixed frame, the opposite end of said lever being provided with an opening for the passage of the shaft 61 and being normally acted upon by the spring 75. At a point intermediate of the length of the lever 76 it is connected to that arm of the bell-crank lever 53 with which the sound-box carriage engages, so that on movement of the bell-crank lever the arm 76 will also be moved, and the shaft 61 and all of its supported parts will be moved toward the right, causing the disengagement of the reproduced record from the main actuating-shaft 2, the end of the auxiliary shaft passing beyond the end of the lip or flange 73 and permitting the spring 74 to revolve the shaft 61 and the disk 60 until a second mandrel-shaft comes into engagement with the lip 73.

In following the operation of the parts a coin is supposed to have been inserted and is resting on the lugs 19. The lever is then depressed, causing the interlocking of arm 17 with the segment through the intervening coin and effecting the winding up of the spring by the turning of the pinion 11 and winding-shaft 10. When pressure on the operating-lever is released, said lever is restored to its initial position by spring 20, and as the arm 17 comes in contact with pin 27 the pawl 22 is raised from engagement with ratchet-wheel 23 and the mechanism allowed to operate. This results in a partial movement of the sound-box, the movement being stopped at any predetermined point in the length of the cylinder by means of the pin 31 and the disk 33, and at the completion of this first reproduction the stylus remains in contact with the record. The operation is again repeated and continues time after time until the sound-box reaches the end of the record, at which time the bell-crank lever 53 will be moved to trip the latch 48, allowing the trough 7 to descend and the return-spring of the sound-box carriage to withdraw the sound-box to the starting-point. This movement is accomplished very quickly and does not interfere with the movement imparted to the lever 76. When this lever is moved, the shaft 61 and all of the parts supported thereby are moved toward the right-hand end of the machine, causing the disengagement of the clutch-faces of the main actuating and auxiliary mandrel-shafts and the movement of the previously-clutched mandrel-shaft from the tongue 73. At this time the spring 74 commences to operate and moves the disk 60 until a second auxiliary mandrel-shaft comes into contact with the lip or flange 73, stopping the movement of the shaft 61, the pressure on the releasing-arm 76 having been relieved as soon as the returning-spring of the sound-box carriage started its retractile movement. When a fresh coin is inserted, the first winding movement brings the pin 46 into engagement with the depending lug 44 and again restores the sound-box and its carriage into operable relation with the record-cylinder and the threaded shaft.

The construction of the multiple-record carrier may be somewhat altered, as illustrated in Figs. 11, 12, 13, and 14. The main spindle 61' has suitable bearings in standards 65', and near one end of the spindle is a wheel 80, on which is wound a cord or chain 81, passing up over a guiding-pulley 82 and provided at its lower end with a weight 83, that serves as a means for imparting intermittent rotative movement to the spindle 61'. This spindle carries two fixed heads or disks 84 and 85, in which are journaled record-carrying standards 86, one end of each of said standards being of the construction shown in Fig. 10 and hereinbefore referred to for the purpose of engaging the end of the actuating-shaft 2. Each standard 86 carries a fixed head 87 in the form of a flanged disk adapted to engage one end of a cylindrical record 88, that may be of any desired manufacture. The opposite end of the record 88 is supported by a flanged disk 89, slidably mounted on the standard 86, the hub of said disk being engaged by one end of a spring 90, coiled around the standard and having its opposite end bearing against a fixed collar 91, carried by said standard. This serves to press the disk 89 in the direction of the disk 87, and the record is firmly clamped, although it may be readily expanded or contracted when subjected to changes in diameter, or it may be readily removed from position when necessary, although it is not intended that these records shall be frequently renewed, inasmuch as the whole multiple record is taken from one machine and then carried to a second, while the multiple record of the second machine is removed and carried to a third, and so on, it being unnecessary to frequently renew the individual records. On one of the supporting-standards is secured a spring 92, having its free end disposed in horizontal alinement with the axis of the shaft 2 and adapted to engage the outer ends of the record-carrying standards in order to more firmly hold the clutching-faces in contact with each other. The base of the machine is provided with a standard 94, forming a support for a bell-crank lever 95, having at one end a roller 96, disposed in the path of movement of the several flanged disks 87. The opposite arm of this bell-crank lever is bell-shaped and in cross-section, being provided with an inclined flange 97, that is disposed within the path of movement of a pin 98, secured to and movable with the adjusting-lever 7 of the sound-box. When the adjusting-lever is held down with the sound-box elevated, the pin 98 is projected, this occurring during the return movement of the carriage, and as such carriage is moved rearwardly under the influence of its retracting-spring the pin 98 will engage the cam-like flange 97 and depress the same, causing the roller 96 to force the disk 87, with which it is engaged, outward or in the direction of the disk 84, the extent of movement being such as to disengage the record-carrying standard from the shaft 2 and permit the counterweight 83 to turn the multiple carrier for a partial revolution. At about the time of the complete disengagement of the two clutch-faces 70 and 71 the pin has reached the end of the cam-shaped flange, and the latter immediately rises under the influence of a spring 99, causing the roller 96 to move from engagement with disk 87 and leaving a free passage for the next succeeding record-carrying mandrel and the latter being moved outward or in the direction of the shaft 2 by means of the spring 92 as it approaches clutching position. This operation is entirely automatic, and when the sound-box again descends into contact with the periphery of the record the pin is withdrawn, so that it cannot again engage the cam-shaped flange during the sound-reproducing movement, and it is only when the sound-box is in inoperative position that the pin is in operative position.

The device forming the subject of the present invention may be operated in many different ways, but has been principally described as used in connection with coin-controlled mechanism. As it is intended principally for advertising purposes, it may be used in connection with any movable object, such as a cash-register drawer or a cork-puller, or, as shown in Fig. 15, a beveled pinion 11' may be substituted for the pinion 11 and the pinion arranged to intermesh with a beveled segment 100, adapted to a vertical standard or held in a bracket 101 on the stationary frame on the jamb of the door. This segment is operatively connected to a door 102, so that on opening or closing movement of the door, as the case may be, the apparatus will be set into motion and the incoming or outgoing customer greeted in suitable manner.

The device forming the subject of this invention may be employed in connection with phonographs or graphophones of any desired construction and may be employed to advantage for the reproduction of musical selections and the like in the usual manner, or it may be connected to a vending-machine or to any operative device, such as coffee-mill, a lever-corkscrew, or other mechanism where it may be desired to reproduce catch phrases or the like.

Having thus described the invention, what is claimed is—

1. In a device of the class specified, the combination with record supporting and revolving means, of a sound-box, a motor-shaft for traversing the sound-box, an actuating-spring connected to the shaft, an actuating-lever for winding the spring to store energy to an extent less than is sufficient to traverse the sound-box for the entire length of the record, means for stopping the record at predetermined intervals and for maintaining the stylus in engagement with the record until the whole of the latter has been reproduced, means for raising the sound-box to disengage the stylus at the completion of a reproduction, and means for restoring the sound-box to its initial position.

2. In a device of the class specified, the combination with a record-carrier and a sound-box, of a motor mechanism for actuating the same, a motor-winding shaft, a disk disposed on the shaft, a pin carried by the disk, and a stop-disk having teeth for a portion only of its periphery and serving by engagement of the pin therewith to stop both the winding and actuating movements of the motor.

3. In a device of the class specified, the combination with a record-carrier and a sound-box, of a motor mechanism for actuating the same, means for stopping the actuating movement of the motor at predetermined intervals, a bar for moving the sound-box to inoperative position, a pivoted arm carrying said bar and provided with a depending lug, a latch adapted to engage said arm thereby to maintain the bar in elevated position, a toothed wheel, a pin carried thereby for engagement with the lug, a winding-shaft having a tooth or lug engaging said wheel, and a bell-crank lever movable to latch-disengaging position by contact with the sound-box carriage at the completion of the reproduction of an entire record.

4. In mechanism of the class described, the combination with a sound-box, of a multiple-record carrier including a pair of spaced disks, record-carrying mandrels, mandrel-shafts projecting through both of the disks and having longitudinal movement independent of said disks, one end of each shaft having a clutch-face for engagement with an actuating-shaft, and a spring for consecutively engaging the opposite ends of the shafts and forcing the same in the direction of the actuating-shaft.

5. In a mechanism of the class described, a multiple-record carrier, a sound-box, means for moving the sound-box during the reproducing and the return movement, a sound-box carrier, a pin supported thereby and movable to operative and inoperative positions by moving of the sound-box, a pivotally-mounted arm for engaging the record-carrier, and a cam connected to the arm and engaged by said pin.

6. In a device of the class specified, the combination with a mandrel-actuating shaft and means for revolving the same, of a plurality of record-carrying mandrels, auxiliary shafts carrying said mandrels having longitudinal movement independently of the same, means for moving the auxiliary shafts into alinement with the mandrel-actuating shaft, and means for clutching the auxiliary shafts to the actuating-shaft.

7. In a device of the class specified, a mandrel-actuating shaft and means for revolving the same, a plurality of record-carrying mandrels, auxiliary mandrel-shafts having longitudinal movement independently of the mandrels and each having a clutch-face and adapted to engage with a similar clutch-face on the end of the actuating-shaft, and means for successively moving the auxiliary shafts into operative relation with the actuating-shaft.

8. In a device of the class specified, a mandrel-actuating shaft and means for rotating the same, a plurality of auxiliary mandrel-carrying shafts, a revoluble carrier therefor, said carrier being longitudinally adjustable, clutching-faces formed on all of the shafts, means for automatically disengaging the auxiliary shaft from the actuating-shaft after the reproduction of the record carried by said auxiliary shaft, means for revolving the carrier to move a second auxiliary shaft into alinement with the actuating-shaft, and means for moving the auxiliary shaft in the direction of the actuating-shaft without corresponding movement of the mandrels and carrier.

9. In mechanism of the class described, the combination with a mandral-actuating shaft and means for revolving the same, said shaft being provided with a clutch-face and having a projecting lip or flange beyond the clutch-face, a plurality of auxiliary mandrel-carrying shafts each having an end clutch-face, and being movable independently of its mandrel, a carrier for all of the auxiliary shafts, a shaft on which the carrier is supported, a spring acting on said carrier-shaft and normally tending to force the carrier and all of the auxiliary shafts in the direction of the clutching-face of the actuating-shaft, a trip-lever with which the sound-box comes into contact at the completion of a reproducing movement, said lever serving to move the carrier in a direction away from the actuating-machine, and a spring connected to the carrying-shaft for imparting rotative movement thereto and to the carrier.

10. In mechanism of the class described, the combination with a mandrel-actuating shaft having a clutch-face and provided with a projecting lip or flange, of a sound-box, means for returning the sound-box to initial position at the completion of a reproducing movement, a plurality of auxiliary record-carrying shafts each having a clutch-face, a revoluble carrier for said auxiliary shafts, said carrier comprising a main shaft, a disk supported on the shaft and to which one end of each of the auxiliary shafts is secured, a plate disposed near the opposite end of said main shaft, and a plurality of pivoted members carried by said plate and provided each with an opening for the reception of the end of one of the auxiliary shafts.

11. In mechanism of the class described, the combination with a mandrel-actuating shaft having a clutch-face, of a sound-box-operating means, mechanism for returning the sound-box to the starting-point after each reproducing movement, a plurality of auxiliary mandrel-carrying shafts each having a clutch-face, a revoluble carrier for all of the auxiliary shafts, a shaft supporting the carrier, a spring for forcing the carrier in the direction of the actuating-shaft, a pair of levers pivoted near one end of the frame and to each other, one of said levers being connected to the carrier-shaft, a sound-box-disengaging bar, a latch for supporting the bar and operated by the second of the pivoted levers, both of said levers being engaged by the sound-box carriage at the completion of a reproducing movement, substantially as specified.

In testimony that I claim the foregoing as my own I have hereto affixed my signature in the presence of two witnesses.

THOMAS F. SOLON.

Witnesses:
   CHAS. A. KEELER,
   MARY T. VIZARD.